United States Patent [19]

Seko et al.

[11] Patent Number: 4,737,231
[45] Date of Patent: Apr. 12, 1988

[54] HEAT SEALING DEVICE

[75] Inventors: Kiyoshi Seko, Nagoya; Mamoru Ichikawa, Aichi, both of Japan

[73] Assignees: Fuji Machinery Co., Ltd.; Japan Packaging Machinery Manufacturer's Association, both of Tokyo, Japan; a part interest

[21] Appl. No.: 816,772

[22] Filed: Jan. 7, 1986

Related U.S. Application Data

[63] Continuation of Ser. No. 626,583, Jul. 2, 1984, abandoned, which is a continuation of Ser. No. 421,652, Sep. 22, 1982, abandoned, which is a continuation of Ser. No. 157,492, Jun. 9, 1980, abandoned.

[51] Int. Cl.[4] .............................................. B32B 31/00
[52] U.S. Cl. ................................. 156/555; 100/93 RP;
156/583.1; 165/104.26; 219/469
[58] Field of Search ...................... 156/583.1, 582, 555;
165/104.26; 100/93 R, 93 P; 219/469, 470, 326;
53/373, 375, 550

[56] References Cited

U.S. PATENT DOCUMENTS

| 1,134,227 | 4/1915 | Reindel | 156/582 X |
| 2,794,485 | 6/1957 | Ashton et al. | 156/251 X |
| 2,955,184 | 10/1960 | Grindrod | 165/104.26 X |
| 3,562,489 | 2/1971 | Lenk | 219/469 |
| 3,982,991 | 9/1976 | Hamm et al. | 156/251 X |
| 4,170,262 | 10/1979 | Marcus | 165/104.26 X |
| 4,288,967 | 9/1981 | Seko et al. | 53/550 |
| 4,288,968 | 9/1981 | Seko et al. | 53/550 |

Primary Examiner—David Simmons
Attorney, Agent, or Firm—John E. Benoit

[57] ABSTRACT

Disclosed herein is a device for sealing portions of an overlapped pair of single or composite films by contacting or facing an appropriately heated sealing surface of a heat sealing member. The heat sealing member is provided with the sealing surface in a part of its outer surface and with a sealed chamber therewithin in the vicinity of the sealing surface. The sealed chamber contains under decompression working liquid for evaporating and generating high-temperature condensable gas by being heated. The heat sealing member further has a heat source in the interior or the exterior thereof adjacent to at least a part of the sealed chamber for heating the working liquid.

2 Claims, 4 Drawing Sheets

HEAT SEALING DEVICE

This application is a continuation of application Ser. No. 626,583, filed July 2, 1984 which is a continuation of Ser. No. 421,652, filed Sept. 22, 1982 which is a continuation of Ser. No. 157,492, filed June 9, 1980, all abandoned.

BACKGROUND OF THE INVENTION

1. Field of the Invention

The present invention relates to a device for sealing a thermoplastic material by heat. The thermoplastic material generally includes a plastic film, which may be a single film, a laminated composite film or a sheet of metal such as aluminum coated by plastics. One of the lapped materials to be sealed is not necessarily thin.

2. Description of the Prior art

In general, heat sealing devices include a rotary type in which a heat sealing member heated by a heater is made in the form of a disc or a roller and a movable or a stationary type in which the heat sealing member is made in the form of a long block.

However, since the heat sealing member made of metal is directly heated by a heater alone in either of the aforementioned devices, the temperature on its sealing surface tends to vary in portion and in time and cannot be kept uniform depending on the quality and the form of the heat sealing member leading to uneven sealing of the film and to various defects caused by inferior sealing of the film. In such a prior art device, further, since thermal conductivity in transferring heat to the sealing surface is low, the device must be set at a high temperature previous to starting of sealing operation in consideration of temperature drop, and as a result, the sealing condition varies as time passes. Such a problem becomes especially conspicuous when a film having high heat absorption capacity or low-temperature melting characteristic is to be sealed.

SUMMARY OF THE INVENTION

The present invention contemplates to overcome the aforementioned disadvantages of the prior art by providing an improved heat sealing device in which evaporation of condensable gas generated by heating of working liquid contained in the heat sealing member is employed as a heat medium for maintaining the heat sealing surface at an appropriate temperature to properly and uniformly seal the film by heat.

The main improvement of the present invention is such that a sealing chamber sealingly containing therein a working liquid serving as a heat medium is disposed in the vicinity of the heating surface in a heat sealing member, and a capillary wick is provided in the sealing chamber. The term "heat sealing member" and "heat sealing surface" are meant to include a heating member to preheat the portion to be sealed when such heating is necessary to ensure more reliable sealing conditions; and a heating surace for such a heating member. The wick accelerates the circulating movement of the condensed working liquid through capillary action toward the evaporating portion in the sealed chamber in opposition to the centrifugal force or the inertial force developed by the rotational, reciprocal or circulating movement of the heat sealing member which contacts the films.

The present invention discloses a characteristic heat sealing device utilizing a movable heating member which provides therein a sealed chamber serving as a heat pipe. Because of this provision, the boundary condition between gaseous and liquid phase of the working liquid in the sealed chamber is balanced in spite of high-speed or low-speed movement of the heat sealing member. Thus, the transportation of a great amount of heat as well as satisfactory reheating from the heat source by the steady circulation of the liquid phase are efficiently achieved.

An object of the present invention is to provide a heat sealing device in which the entire sealing surface of a heat sealing member is uniformly heated regardless of length and thickness of the sealing member and continuously maintained at a predetermined temperature to satisfactorily seal a portion of a film to be sealed.

Another object of the present invention is to provide a heat sealing device which can quickly transfer a predetermined amount of heat to the sealing surface of a heat sealing member utilizing latent heat of evaporation and condensation of a working liquid contained in the heat sealing member.

Still another object of the present invention is to provide a heat sealing device in which various forms of a heat sealing member may be selected in response to the modes of heat sealing, and a uniform sealing operation is carried out regardless of thickness or size of the overlapped portion of the film to be sealed.

A still further object of the present invention is to provide a heat sealing device in which the form and the mode of the movement of the heat sealing member is discretionarily selected and the arrangement of the additional heat souce means is simplified by utilizing a working liquid as a heating medium for transferring heat to the heat sealing surface so as to transfer heat efficiently by evaporating gas and by providing a wick to ensure circulation of the condensed working liquid charged in the sealed chamber toward the evaporating portion in the vicinity of the heat source.

A still further object of the present invention is to facilitate operational efficiency of a heat sealing device by quickly transferring a large amount of heat to a heat sealing surface to reduce the time for starting operation of the device and enable high-speed operation.

A still further object of the present invention is to simplify construction and manufacturing of a heat sealing member for a heat sealing device by providing a compact tubular member sealingly containing working liquid within the heat sealing member as a jacket.

DESCRIPTION OF THE PREFERRED EMBODIMENTS

Figure 1:
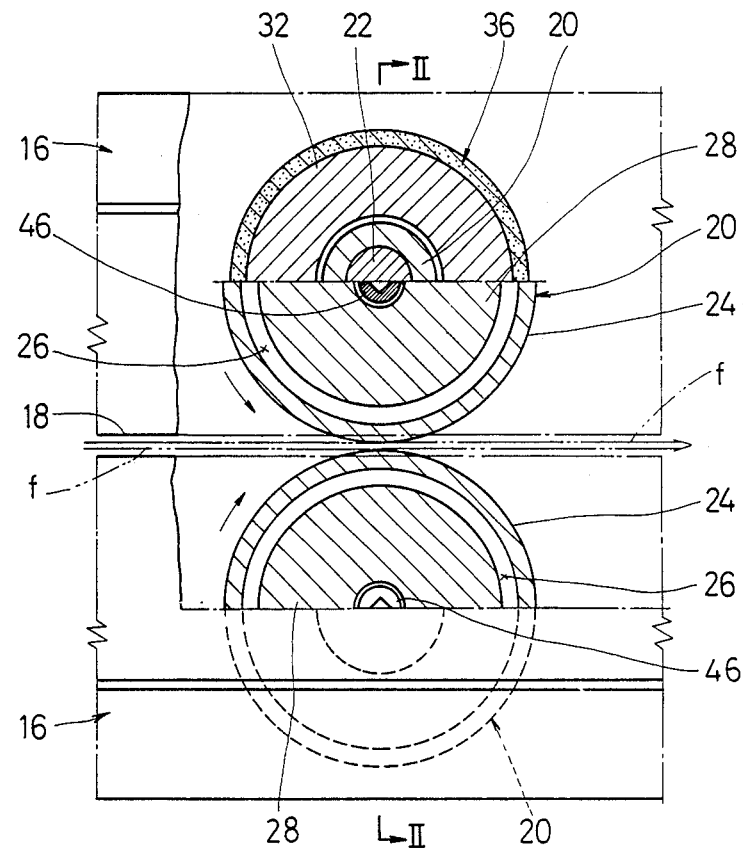
FIG. 1 is a partial fragmentary plan view of a device according to the present invention utilizing disc-shaped heat sealing members.
Figure 2:
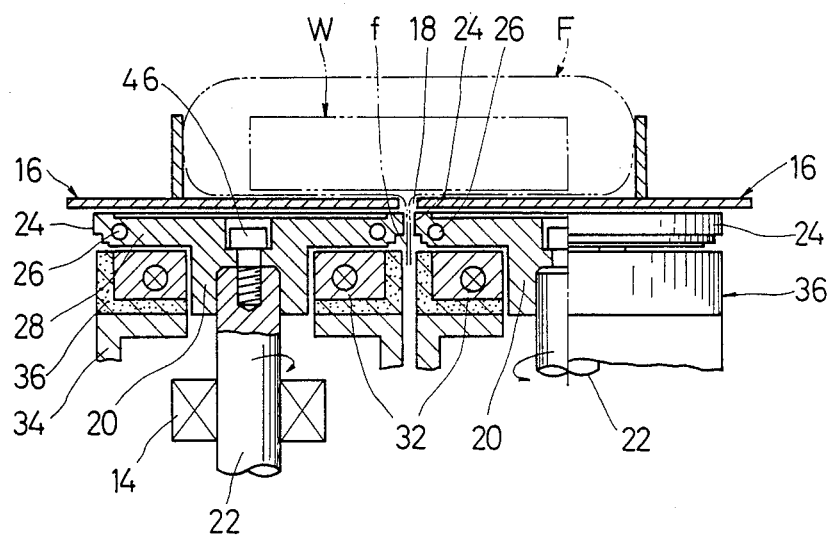
FIG. 2 is a longitudinal cross sectional view taken along lines II—II in FIG. 1.
Figure 3:
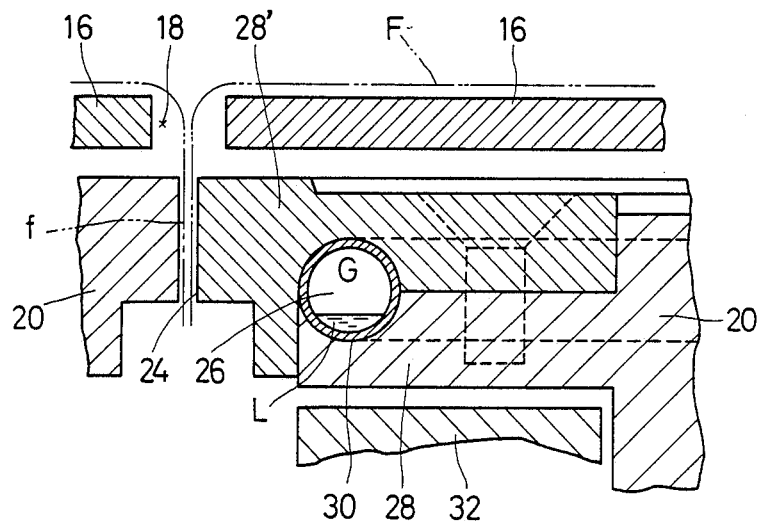
FIG. 3 is an enlarged side sectional view showing an embodiment utilizing a sealed tube.

Referring now to FIGS. 1 and 2 of the drawings, a film F wrapping a product to be wrapped W in a cylindrical form is held between a pair of feeding beds 16 while the axial ends f thereof to be sealed by heat are overlapped with each other and extend downwardly from a guide channel 18 of the feeding beds 16, and is fed along the longitudinal direction of the feeding beds 16 by a conveyer (not shown). A pair of disc-shaped heat sealing members 20 are secured to a rotating shaft 22 which is supported by a bearing 14 to be driven thereby, and are rotated at the same circumferential speed with the speed of movement of the film F holding the ends f of the film F between heat sealing surfaces 24 defined by the outer peripheries thereof. Each of the heat sealing surfaces 20 has an annular sealed chamber 26 in the vicinity of the heat sealing surface 24 which is provided coaxially therewith. The sealed chamber 26 is generally circular in section, and contains under decompression an appropriate volume of working liquid L for generating condensable gas G which functions as a heat medium. As shown in FIG. 3, the sealed chamber 26 may be formed by an annular tube 30 previously containing the working liquid, which is engaged with an annular space formed between a disc-shaped portion 28 and a lid 28' detachably mounted on the disc-shaped portion 28 so as to closely contact with the inner walls of the annular space, so that the annular tube 30 can be easily exchanged by removing the lid 28' from the disc-shaped portion 28 if necessary. A ring-shaped electric heater 32, generally containing nichrome wire, is provided adjacently under the disc-shaped portion 28 as a heat source for evaporating the working liquid L in the annular tube 30.

The working liquid L is prepared by fluid which can easily be kept at an appropriate temperature for sealing the film F and is stable within a temperature range of 5° C. to 230° C. For example, water is very useful as the working liquid L. When the working liquid L is prepared by water, main portions of the heat sealing members 20 in contact therewith are to be made of copper. The sealed chambers 26 are padded by a fibrous material such as metal or glass to facilitate returning of the working liquid L by capillarity, which is to be sufficiently filled by the working liquid L. The working liquid L may be prepared by alcohol, methanol, Freon or ammonia, and in this case, the aforementioned main portions in contact therewith are made of stainless steel.

The working liquid L is introduced into the sealed chambers 26 under the condition that air is discharged and material turning into noncondensable impure gas and generating noxious corrosive material is removed from the chambers 26, which are appropriately decompressed. The working liquid L may be introduced into the chambers 26 either in a liquid phase or in a gaseous phase, though, it should be a mixture of the liquid and the gaseous phases to effectively function as a heat medium.

In the heat sealing device thus constructed, the working liquid L contained in the heat sealing members 20 is heated by the electric heater 32. The working liquid L contained in the sealed chamber 26 absorbs heat in a portion in the vicinity of the heater 32 to evaporate and generate high-temperature condensable gas G accompanied by pressure rising. The condensable gas G moves within the sealed chamber 26 and quickly reaches a cooled portion in which the heat sealing members 20 come in contact with the film F to be condensed there and uniformly transfer evaporation heat (great part is condensation latent heat) to the sealing surface 24. The working liquid L condensed around the inner surface of the sealed chamber 26 corresponding to the sealed surface 24 is quickly returned to the evaporating portion through the fibrous material in the sealed chamber 26. While the heat transfer by the evaporation latent heat and the return of the condensed liquid are repeated, the entire sealing surface 24 is uniformly heated at an appropriate temperature in a short time. It is to be noted that the device according to the present invention is set at an appropriate temperature in a very short time, i.e., about 2 or 3 minutes. This is under one-sixth of that of a conventional device as compared under the same condition.

When the heat sealing members 20 are thus heated at the appropriate temperature, the film F is forwarded from left to right in FIG. 1 so that the axial ends f thereof are uniformly sealed by the heat sealing members 20 in the direction of movement while the same are held between the disc-shaped portions 28 and guided thereby. A certain quantity of heat is continuously supplied from the electric heater 32 to the working liquid L in response to heat consumption at the sealing portion, and the electric heater 32 is generally controlled by a voltage regulation system. The electric heater 32 is shown in an annular form in FIGS. 2 and 3, though, it may be arranged opposite to a part of the heat sealing member 20 to transfer a sufficient quantity of heat since heat transferring capacity within the sealed chamber 26 by the condensable gas G is excellent in comparison with the conventional heat sealing members. Further, electrical heating may be conducted by an induction heating system or dielectric heating system other than resistance heating system. The heating sealing member 20 in FIG. 3 consists of a disc body 28 and an annular lid 28' secured thereto by bolts. An annular chamber 26 is formed between the disc body 28 and the lid 28' by their coresponding recesses. An annular tube 30 is previously charged with the working liquid L and detachably engaged in the annular chamber 26.

Figure 4:
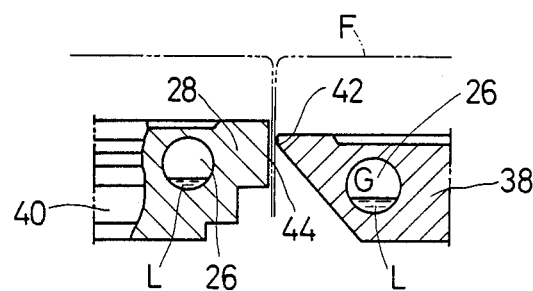
FIG. 4 is a side sectional view of a main portion of a disc-shaped heat sealing member having a heat severing means.

In FIG. 4, there are shown a pair of disc-shaped heat sealing members 38 and 40, one of which has a sharp knife 42 in its outer periphery while the other has a knife seat 44 in its outer periphery for cutting down unnecessary end portions of the film F.

There will now be described modifications of the present invention in which the heat sealing member is provided in the form of an oblong block. The block-shaped heat sealing member is utilized for sealing the film across the direction of movement thereof. Further, when the film is to be intermittently sealed in the direction of movement, the block-shaped heat sealing member is more appropriate than the rotation type sealing member.

Figure 5:
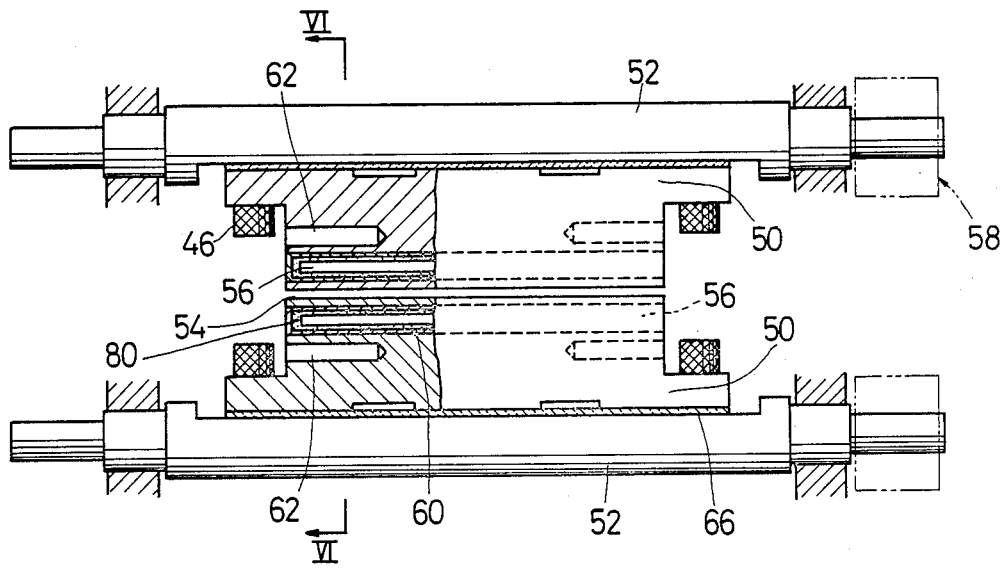
FIG. 5 is a partial fragmentary front elevational view of a heat sealing device utilizing block-shaped heat sealing members.
Figure 6:
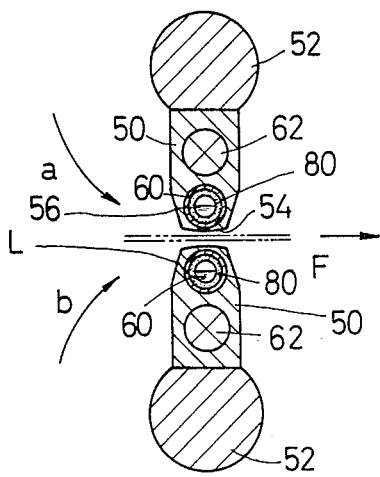

In FIGS. 5 and 6, a pair of heat sealing members 50 are radially secured by bolts 46 to a pair of rotating shafts 52 which are supported by a frame to define sealing surfaces 54 in free ends thereof which are arcuate in section, and have longitudinal linear sealed chambers 56 therewithin in the vicinity of the sealing surfaces 54, which contain the working liquid L under decompression. The sealed chamber 56 may be formed by a through-hole provided within the heat sealing member 50 and closed at both ends by suitable lids, or may be formed by a linear pipe 60 previously containing the working liquid L and inserted into the through-hole so as to closely contact the inner wall of the through-hole, so that the linear pipe 60 can be easily exchanged by extracting the same from the through-hole if necessary. As means for heating the working liquid L, cartridge heaters 62 are inserted into both ends of the base portions of the heat sealing members 50, and are connected to an electric source (not shown) through conductive brushes 58 provided on the ends of the rotating shafts 52. Since heat transfer by evaporated gas G of the working liquid L is efficient, the heater 62 is not necessarily provided along the entire length of the sealed chamber 56, and may be placed in longitudinal one side or in the center portion of the heat sealing member 50. The heat sealing members 50 are generally provided in a pair to hold the film F to be sealed and are placed transversely against the feeding path thereof, and are synchronizedly rotated in the reverse direction as shown in arrows a and b in FIG. 6.

Figure 7:
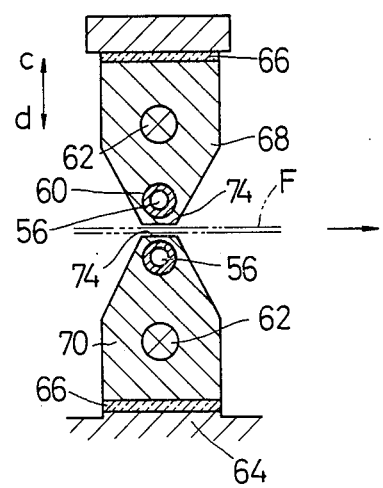

In FIG. 7, a pair of block-shaped heat sealing members 68 and 70 each having the sealed chamber 56 and the heater 62 therewithin are oppositely provided to hold the film F between flat sealing surfaces 74. In this embodiment, one heat sealing member 70 is fixed through a heat insulating material 66 to a frame 64, and the other heat sealing member 68 intermittently and reciprocally moves in the direction of arrows c and d to seal two films F upon contact of the sealing surfaces 74.

In such construction, both heat sealing members may be synchronizedly reciprocally move oppositely with each other, or, a pair of heat sealing members may be moved in parallel in a short distance along the direction in which the film is conveyed at the same speed to seal the film, i.e., the heat sealing members are circulatingly moved symmetrically with respect to the film in so-called box motion. With respect to a means for conducting linear reciprocal movement or box motion of the heat sealing member, conventional means such as a hydraulic cylinder, a lever and/or a chain movable along a guide rail may be combined, the form of which is not limited.

Figure 8:
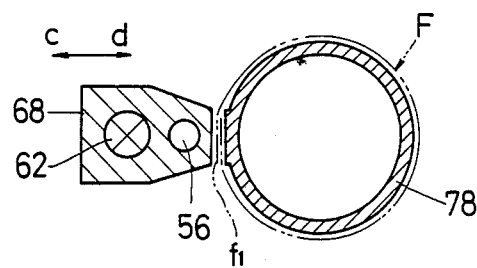
FIGS. 7 and 8 are illustrative cross sectional views showing modifications of the block-shaped heat sealing member.
Figure 9:
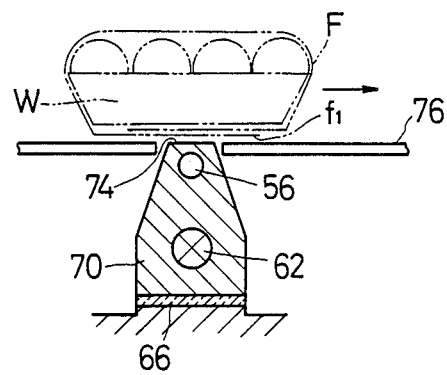

In FIG. 8, a heat sealing member 68 having a sealed chamber 56 and a heater 62 therwithin is provided in the form of a block, and is not rotated but intermittently and reciprocally moves as shown by arrows c and d to approach and separate from lapped axial ends f1 of the film F enclosing the outer periphery of a vertical cylindrical member 78 to be axially downwardly conveyed, and seals the lapped end f1 upon contact therewith. The cylindrical member 78 functions to guide the product to be wrapped and introduce the same in a bag formed by the film F.

In any of the aforementioned disc or roller shaped and block shaped heat sealing members, the sealed chamber may be formed by a circular or a linear tube detachably and replaceably engaged in the heat sealing member so that the heat sealing member is easily manufactured and to simplify selection of the temperature conditions with respect to various kinds of materials to be sealed. Further, the sealed chamber or tube may be semicircular, oval, square or trapezoidal in section.

Within the sealed chamber or tube of the heat sealing member, there is provided a padding material for returning the working liquid condensed following sealing operation of the film to the evaporating portion and conducting capillary pump action. Such a padding material is indispensable, when the heat sealing member is movable, it is highly effective to provide the padding material in principle so that heat transferring capacity is increased by separation of passages of the gaseous phase and the liquid phase and facilitation of returning thereof. The padding material is prepared by porous material such as a wire gauze and a fibrous layer, and is made in the form of a pipe or a plate. When the sealed chamber is large-sized, a plurality of longitudinal grooves are provided in the peripheral wall thereof to be tubularly lined by the porous material. It is a matter of course that the padding material should not be corroded by the working liquid. The drawings show the construction as included only one or one pair of the heat sealing members. However, in the case that the films to be heated require a great amount of heat for sealing them because of the films being relatively thick or that the sealing operation should be made at high speed, the heat sealing device should be constructed with two or two pairs of heat sealing members for preheating the films at the first step and subsequently sealing at the second step.

Figure 10:
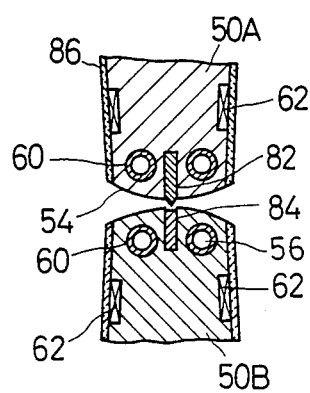
FIGS. 10 to 12 are cross sectional views showing main portions of block-shaped heat sealing members having heat severing means.

According to the present invention, further, the block-shaped heat sealing member can also sever the film by heat by provision of a severing means in its heat sealing surface. In the embodiment as shown in FIG. 10, a pair of block-shaped heat sealing members 50A and 50B have a knife 82 and a knife seat 84 respectively. In this embodiment, further, each of the heat sealing members 50A and 50B has a pair of sealed chambers 60.

Figure 11:
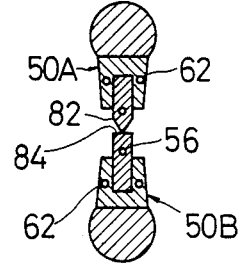
Figure 12:
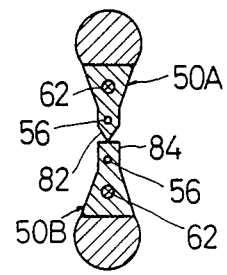

In FIGS. 11 and 12, each pair of block-type heating members 50A and 50B has a knife 82 and a knife seat 84 respectively. These knives 82 and the knife seats 84 are uniformly heated by the working liquid contained in the sealed chambers 56 and effectively sever the film by heat by sharp mechanical construction.

When it is preferable to sufficiently seal both sides or one side of the severed portion, a sealing surface 54 of required width is formed in one or either of the knife 82 and the knife seat 84 of the heating members 50A and 50B as shown in FIG. 10.

It is to be noted that two or more sealed chambers 60 and heaters 62 may be provided within a heated block or roller to facilitate uniform heating, and the heat insulating materials 36, 66 and 86 may be provided in appropriate portions to prevent unnecessary radiation of heat.

While the invention has been described with reference to a few preferred embodiments thereof, it is to be understood that modifications or variations may be easily made without departing from the scope of this invention which is defined by the appended claims.

What is claimed is:

1. A heat sealing device for sealing portions of thermoplastic material such as a single film, a laminated film, a composite film with metal foil and the like comprising:
a pair of rotatable heat sealing members each having on the outerside thereof a heat sealing surface which is adapted to contact sealing portions of said material to be sealed and transfer heat thereto, each of said heat sealing members comprising
a disc-shaped portion;
an annular lid portion removably mounted to said disc-shaped portion;
an annular chamber formed between said disc-shaped portion and said annular lid portion and being concentric therewith, a first portion of the inner wall of said annular chamber being defined by said disc-shaped portion and the remaining portion of the inner wall of said annular chamber being defined by said annular lid portion;

an exchangeable annular tube retained within said annular chamber such that the outer wall of said annular tube closely contacts said inner wall of said annular chamber;

means for releasably securing said annular lid portion to said disc-shaped portion to permit said annular lid portion to be removed from and replaced on said disc-shaped portion and thereby permit access to and replacement of said annular tube;

a working liquid partially filling said annular tube and charging said annular tube under decompression through evacuation of air therewithin; and an electric heater positioned on said disc-shaped portion adjacent said first portion of said inner wall of said annular chamber;

whereby said working liquid within each said annular tube is evaporated at the portion adjacent said electric heater so as to generate vapor of high temperature, condensation latent heat thereof being given off at the portion adjacent each said heat sealing surface contacting said material to be sealed, so that the heat for sealing said material to be sealed is transferred in a form of said vaporized working liquid through a circulating cycle of gaseous phase and liquid phase of said working liquid.

2. A heat sealing device according to claim 1, wherein:

said disc-shaped portion is mounted on a rotatable shaft and has a substantially annular planar surface with an annular depression in said planar surface defining said first portion of said inner wall of said annular chamber;

said annular lid portion has:

a further annular planar surface, corresponding to said annular planar surface of said disc-shaped portion, with a further annular depression in said further planar surface defining said further portion of the inner wall of said annular chamber, and said heat sealing surface in an annular configuration; and said means for releasably securing said annular lid portion to said disc-shaped portion comprises screw means for securing said further annular planar surface of said lid portion in direct contact with said annular planar surface of said disc-shaped portion with said exchangeable annular tube retained within said annular chamber formed by said further annular depression of said annular lid portion and said annular depression of said disc-shaped portion.

* * * * *